United States Patent [19]

Clungeon et al.

[11] Patent Number: 5,658,427
[45] Date of Patent: Aug. 19, 1997

[54] ETHOXYLATED SOYA GLYCERIDES WITH GLYCOLS AS DEINKING COLLECTOR MODIFIERS

[75] Inventors: Nancy S. Clungeon, Tega Cay, S.C.; Sheila Deveneaux, Charlotte, N.C.; Christy A. Richards, Rock Hill, S.C.; Jose M. Rodriguez, Sandersville, Ga.

[73] Assignee: Geo Specialty Chemicals, Inc., Cleveland, Ohio

[21] Appl. No.: 509,884

[22] Filed: Aug. 1, 1995

[51] Int. Cl.$^6$ .................................................. D21C 5/02
[52] U.S. Cl. ............................................................. 12/5
[58] Field of Search ...................... 162/5, 4, 6; 510/174, 510/424; 252/60, 61

[56] References Cited

U.S. PATENT DOCUMENTS

| | | | |
|---|---|---|---|
| 4,586,982 | 5/1986 | Poppel et al. | 162/5 |
| 4,964,949 | 10/1990 | Hamaguchi et al. | 162/5 |
| 5,120,397 | 6/1992 | Urshibata et al. | 162/5 |
| 5,158,697 | 10/1992 | Kawamori et al. | 252/60 |
| 5,281,358 | 1/1994 | Urshibata et al. | 510/174 |
| 5,442,082 | 8/1995 | Uphues et al. | 554/149 |
| 5,505,817 | 4/1996 | Rodriguez et al. | 162/5 |

FOREIGN PATENT DOCUMENTS

| | | |
|---|---|---|
| D11549 | 2/1952 | Germany. |
| 857364 | 10/1952 | Germany. |
| 2903150 | 8/1980 | Germany. |

OTHER PUBLICATIONS

"Ullmanns Encyklopädie der technischen Chemie", 4th Edt., vol. 17, (1979), pp. 570–572.

"Tappi" (Technical Association of the Pulp and Paper Industry), vol. 63 (1980), No. 9 pp. 113–116.

"Chemische Technologie", vol. 7, pp. 131–132, Carl-hanser-Verlag, München/Wein (1986).

*Primary Examiner*—Donald E. Czaja
*Assistant Examiner*—Jose A. Fortuna
*Attorney, Agent, or Firm*—Thompson Hine & Flory LLP

[57] ABSTRACT

A collector composition for deinking printed waste paper containing a mixture of (a) the reaction product of an epoxidized derivative of a $C_{10-22}$ carboxylic acid and an alkoxylated polyhydroxy alcohol or an alkoxylated derivative of a $C_{10-22}$ carboxylic acid, (b) ethoxylated soya glyceride, and (c) a polyol.

11 Claims, No Drawings

ETHOXYLATED SOYA GLYCERIDES WITH GLYCOLS AS DEINKING COLLECTOR MODIFIERS

BACKGROUND OF THE INVENTION

1. Field of the Invention

This invention relates to a composition and process for de-inking printed waste paper. More particularly, by employing a de-inking collector composition containing a mixture of (a) the reaction product of an epoxidized derivative of a $C_{10-22}$ carboxylic acid and an alkoxylated polyhydroxy alcohol or an ethoxylated derivative of a $C_{10-22}$ carboxylic acid, (b) ethoxylated soya glycerides, and (c) a polyol, in a conventional de-inking process, an enhanced amount of ink particles can be collected and separated from a de-inked pulp suspension, resulting in both increased pulp retrieval and whiter pulp.

2. Discussion of Related Art

De-inking refers to the selective removal of printing ink from a waste paper fiber suspension. The reusable material is processed into finished products, e.g. writing paper, printing paper, toilet paper, newspapers, magazines, etc depending on the individual starting material. The essential steps of the de-inking process are at first, the removal of the printing inks from the fibers in a pulper by means of suitable chemicals, and then selectively separating the printing inks from the fiber suspension. Both in the flotation- and the wash-de-inking processes, these steps are usually carried out in an alkaline medium, where the printing ink is removed in flotation cells or washers. The reusable material obtained is then processed into the desired products.

A commonly used chemical formulation for de-inking waste paper can be as follows: (quantities refer to the dry matter content of the waste-paper)

0.5 to 2.0% by weight of alkali-metal hydroxide (100%), 0.2 to 1.5% by weight of soap or fatty acid (100%), 0.05 to 0.1% by weight of nonionic dispersing agent (100%), 2.0 to 5.0% by weight of alkali-metal silicate (water glass), 0.1 to 0.3% by weight of diethylenetriaminepentaacetic acid, Na salt (DTPA) (40%), and 0.5 to 3.0% by weight of oxidizing or bleaching agent (100%).

The effects of the individual chemicals in the flotation process are as follows: alkali metal hydroxide, preferably sodium hydroxide, causes the fibers to swell thus making it easier to loosen the inter-fiber bonds as well as to separate the printing-ink. This is further promoted by the neutralization or saponification of printing ink binders. Furthermore, sodium hydroxide provides the necessary alkalinity for the neutralization of the fatty acids, which is necessary for their function as collectors. Nonionic dispersing agents cause improved wetting of the fibers by lowering the surface tension of the water, which promotes inter alia the action of the other chemicals, and which essentially results in the loosening of the printing inks and their dispersion. By the dispersion of the printing inks the re-absorption into the fibers is prevented or makes it difficult for them to become reattached to the fibers.

The separated pigments and/or dyes are hydrophobized by the collectors, i.e. usually fatty acids, surfactants or soaps, which makes selective removal possible. With the anionic collectors previously used, together with the alkaline medium, the water hardness formers are of decisive importance for this function, because only their calcium salts cause hydrophobing of the printing ink particles, thus making the latter floatable. Oxidizing/bleaching agents prevent or compensate for the yellowing of the wood-containing constituent of the waste paper and in addition—depending on the amount used—cause further bleaching of the fibers. Alkali silicates and DTPA (Diethylene-triaminepenta-acetic acid) are used for their stabilization, which prevent a too rapid decomposition of the bleaching agents by complexing the heavy metals. Depending on the end product desired, newspapers, magazines, computer paper, files, etc., but in most cases mixtures of these are used as waste-paper, both the printing-ink system employed and their age playing a decisive role in the possibility of de-inking them.

After the de-inking process, the paper is evaluated by measurement of the degree of whiteness or brightness in which the whiteness or brightness of the test sheets is compared to that of a standard, e.g. barium sulfate with measurement of the degree of whiteness according to Elrepho given in percentages, or brightness measurements recorded as percent gain. For example, a waste paper mixture of newspapers and magazines in the ratio of 1:1 gives a whiteness of 56 to 60%, where the whiteness of the unprinted margins of this waste paper amounts to approximately 65 to 68%.

German patent application No. DE-OS 29 03 150 describes a process for the de-inking of printed waste paper by treating the paper pulp in a pulper at alkaline pH values with alkali silicate, oxidizing or bleaching agents, higher fatty acids or their salts and nonionic dispersing agents, and separation of the loosened printing ink particles from the dyestuff-suspension by flotation, where a fatty acid alkanolamide is additionally used in the pulper.

On the other hand, U.S. Pat. No. 4,586,982 describes a similar process which is differentiated from the above named DE-OS 29 03 150 in that no fatty acid alkanolamide is used in the pulper and in that the fatty acids and/or resin acids and the dispersing agents are used in the form of an oil-in-water-emulsion. The known processes, however, show several disadvantages.

The use of solid fatty acids as collectors necessitates a melting apparatus or a heated storage container if they are supplied already melted. Heating is not necessary if fatty acids are used having a melting point below the normal temperature range. These, however, usually present disadvantages for industrial use. The liquid fatty acids which have a higher melting point only saponify slowly under the reaction conditions in the pulper, such that the soaps forming on the surface of the fatty acid particles make the further saponification of the enclosed fatty acids more difficult and can even prevent it. This fact not only results in a reduction of the collector effect, but can also lead to an increased flotation of the fibers and felt pollution, through the hydrophobing of the fibers by the unsaponified fatty acids.

In order to overcome these difficulties, according to the prior art, saponification units are connected downsteam of the storage tanks. The resulting aqueous soap solution must then be permanently heated, until used, because the latter forms gels at normal temperature, i.e., the intermediate storage containers as well as the dosing pipes including the dosing-head of the dosing pump must be thermally insulated and continuously heated.

If solid soaps are used, a saponification plant is not necessary. As the complete solubility of the soap granules is not given in most cases in the conditions dependent on the process, dissolving plants must be installed to prevent negative effects. The disadvantages described above still apply to the resulting soap solution.

A further considerable disadvantage of the prior art is to be seen in that the above mentioned formation of calcium soap of the fatty acid, which were first effective as collectors, only successively takes place during the de-inking process in the pulper with the hardness-former of the water used. The reaction time required for this increases the total length of time necessary for the process; and an incomplete reaction causes a worse de-inking result, which is also reflected in lower degrees of whiteness. Processes in which the fatty acids are used in the form of an emulsion also have these disadvantages.

In another prior art process as disclosed in U.S. Ser. No. 07/854,982 filed Apr. 23, 1992 for the deinking of printed waste paper, a collector composition consists of epoxidized derivatives of $C_{10-22}$ carboxylic acids reacted with alkoxylated polyhydroxy alcohols.

Furthermore, in German Patent Application D 11549 IVa/55b a process for the regeneration of waste paper by an alkaline aqueous liquor is described. The liquors to be used here contain: a) water glass, b) at least one oxygen-evolving compound, such as hydrogen peroxide, sodium peroxide, perborate, per-carbonate, c) at least one protective colloid containing nitrogen in an amide or sulfonamide type bond, and d) at least one nitrogen-free organic compound with a wetting- and washing-effect. A possible protective colloid (component c) is a condensation product of a soluble protein substance or of a higher molecular weight protein cleavage product with a soap-forming fatty-, resin- or naphthene acid or with an aliphatic or aliphatic-aromatic sulfonic acid. In particular, alkyl benzenesulfonic acid salts with 10 to 18 C-atoms in the alkyl radical are used as nitrogen-free wetting agents and detergents. The compounds used in this process as protective colloids reduce the fiber damage or fiber loss which is otherwise observed.

The process described in the afore-mentioned German Patent application refers to so-called "wash-de-inking", in which the printing-ink is dispersed in the best possible way by pulping of the waste paper. The printing ink remains in the liquor and is then washed out with the liquor in a subsequent draining stage.

Another de-inking process is what is known as "flotation-de-inking", in which the different wetabilities of the printing-ink and the paper fibers is used for their separation. The hydrophobic printing-ink is flocculated and collected and then separated in the flotation foam.

Details of the differences of the two de-inking processes can be found in: "Ullmanns Encyklopadie der technische Chemie", 4th Edition, Volume 17 (1979), pp. 570 to 572, as well as in "Tappi" (Technical Association of the Pulp and Paper Industry"), Volume 63 (1980), No. 9, pp. 113 to 116. According to this, the real difference between the wash process and the flotation process consists in the printing inks separation principle. The actual de-inking chemical in the wash process is a detersire dispersing agent, which is responsible for producing a stable dispersion of separated printing-ink particles and for preventing a renewed adsorption of these particles to the fibers. By contrast, the actual de-inking chemical in the flotation process is the so-called collector, which is responsible for causing a specific adsorption of the printing-ink particles in the air bubbles. The two processes are therefore not comparable with each other either as such or with respect to the mode of action of the chemicals used.

With respect to the above mentioned prior art it is an object of the present invention to make available an improved collector and flotation process for de-inking printed waste paper which provides regenerated pulp having outstanding whiteness or brightness levels.

SUMMARY OF THE INVENTION

Other than in the operating examples, or where otherwise indicated, all numbers expressing quantities of ingredients or reaction conditions used herein are to be understood as modified in all instances by the term "about".

It has now been surprisingly found that a waste paper deinking collector composition comprising a mixture of (a) the reaction product of an epoxidized derivative of a $C_{10-22}$ carboxylic acid with an alkoxylated polyhydroxy alcohol, or an ethoxylated derivative of $C_{10-22}$ carboxylic acid, (b) an ethoxylated soya glyceride, and (c) a polyol provides deinked wastepaper having an improved degree of brightness. Accordingly, mixtures of components (a) and (b), or of components (b) and (c), or mixtures of components (a), (b) and (c) are suitable in accordance with this invention. The deinking collector composition may comprise a mixture of (a) from about 1 to about 99% by weight of the reaction product of an epoxidized derivative of a $C_{10-22}$ carboxylic acid with an alkoxylated polyhydroxy alcohol, or an ethoxylated derivative of a $C_{10-22}$ carboxylic acid, (b) from about 99 to about 1% by weight of ethoxylated soya glycerides, and (c) from about 0 to about 60% by weight of a polyol, all weights based on the weight of the composition, when used in conventional deinking processes, results in the retrieval of paper pulp having enhanced levels of brightness.

The present invention also provides a process for deinking printed wastepaper comprising; (A) fiberizing said wastepaper in an aqueous deinking solution containing a deinking effective quantity of a collector composition containing a mixture of (a) from about 1 to about 99% by weight of the reaction product of an epoxidized derivative of a $C_{10-22}$ carboxylic acid and an alkoxylated polyhydroxy alcohol, or an ethoxylated derivative of a $C_{10-22}$ carboxylic acid, (b) from about 99 to about 1% by weight of an ethoxylated soya glyceride, and (c) from about 0 to about 60% by weight of a polyol, all weights based on the weight of the collector composition; and (B) removing the detached ink particles from the deinking solution.

DESCRIPTION OF THE INVENTION

The present invention relates to a waste paper deinking collector composition comprising a mixture of (a) the reaction product of an epoxidized derivative of a $C_{10-22}$ carboxylic acid with an alkoxylated polyhydroxy alcohol, or an ethoxylated derivative of a $C_{10-22}$ carboxylic acid, (b) ethoxylated soya glycerides, and (c) a polyol; or a mixture of components (a) and (b); or a mixture of components (b) and (c). The epoxidized derivatives of $C_{10-22}$ carboxylic acids are obtained by epoxidation of derivatives of unsaturated $C_{10-22}$ carboxylic acids. According to the process described in German Patent Specification (DE-PS) 857 364, unsaturated carboxylic acid derivatives can be epoxidized by reaction with peracetic acid in the presence of acidic catalysts or with performic acid formed in situ from formic acid and hydrogen peroxide. The iodine values of the resulting epoxidation products are below 20, and preferably below 15. Suitable unsaturated carboxylic acid derivatives include all naturally occurring or synthetically preparable carboxylic acid derivatives which are free from OH groups and contain carboxylic acid moieties with at least 1 or 2 double bond(s) in the 9 and/or 13-positions, for example, 9c-dodecenoic acid, 9c-tetradecenoic acid, 9c-hexadecenoic acid, 9c-octadecenoic acid, 9t-octadecenoic acid, 9c,12c-octadecenoic acid, 9c,12c,15c-octadecatrienoic acid, 9c-eicosenoic acid and/or 13c-eicosenoic acid derivatives, and/or mixtures thereof having at least a high content of such unsaturated carboxylic acid derivatives. Unsaturated carboxylic acid derivatives containing $C_{16-22}$-carboxylic acid moieties having at least 1 or 2 double bond(s) in the 9- and/or 13-positions are preferred. Suitable unsaturated carboxylic acid derivatives are, for example, unsaturated carboxylic acid esters, unsaturated carboxylic acid amides, unsaturated carboxylic acid mono- and/or di-$C_{1-4}$ alkylamides and/or unsaturated carboxylic acid mono- and/or di-$C_{1-4}$ alkanolamides. Unsaturated carboxylic acid alkyl esters having from 1 to 18 carbon atoms in the monohydric alcohol moiety and/or mono-, di- and/or triglycerides containing carboxylic acid moieties having at least 1 or 2 double bond(s) in the 9- and/or 13-positions are preferred.

Examples of unsaturated $C_{10}$–$C_{22}$ carboxylic acid $C_1$–$C_{18}$ alkyl esters which are accessible in a per se known manner by esterifying the corresponding OH-group-free unsaturated carboxylic acids or by transesterification of the respective mono-, di- and/or tri-glycerides with $C_1$–$C_{18}$-alkyl alcohols such as, for example, methanol, ethanol, propanol, butanol, isobutanol, 2-ethylhexanol, decanol and/or stearyl alcohol include palmitoleic acid methyl ester, oleic acid methyl ester, oleic acid ethyl ester, oleic acid isobutyl ester, oleic acid 2-ethylhexyl ester, oleic acid decyl ester, and $C_{10}$–$C_{22}$ carboxylic acid $C_1$–$C_{18}$ -alkyl ester mixtures having at least a high content of such $C_{10}$–$C_{22}$ carboxylic acid $C_1$–$C_{18}$ alkyl esters which have at least 1 or 2 double bond(s) in the 9- and/or 13-positions such as palm fatty acid methyl ester, soybean fatty acid methyl ester, soybean fatty acid 2-ethylhexyl ester, rapeseed fatty acid methyl ester and/or tallow fatty acid ethyl ester. As the mono-, di- and/or tri-glycerides containing $C_{10}$–$C_{22}$ carboxylic acid moieties which are unsaturated and free from OH groups and have at least 1 or 2 double bond(s) in the 9- and/or 13-positions, especially suitable are fats and/or oils of natural origin, the carboxylic acid contents of which are predominantly composed of unsaturated $C_{10}$–$C_{22}$-carboxylic acids which have at least 1 or 2 double bond(s) in the 9- and/or 13-positions, preferably predominantly of unsaturated $C_{16}$–$C_{22}$-carboxylic acids which have at least 1 or 2 double bond(s) in the 9- and/or 13-positions, such as olive oil, linseed oil, sunflower oil, safflower oil, soybean oil, peanut oil, cottonseed oil, rapeseed oil which is rich in erucic acid and/or low in erucic acid, palm oil, lard and/or tallow.

Examples of alkoxylated polyhydroxy alcohols include the alkoxylation products of glycol, glycerol, "neo" polyols such as trimethylolpropane, trimethylolethane, pentaerythritol, and polymers of the latter, alkyl polysaccharides, and carbohydrate-derived polyols such as sorbitol, mannitol, etc.

Ethoxylated sorbitol is a preferred alkoxylated sugar alcohol for reaction with epoxidized derivatives of $C_{10}$–$C_{22}$ carboxylic acids to obtain the deinking chemicals in accordance with this invention.

The polyhydroxy alcohols are alkoxylated by known industrial methods, preferably with ethylene oxide, propylene oxide and/or butylene oxide and more preferably with ethylene oxide and/or propylene oxide, optionally in the presence of catalysts, for example potassium hydroxide and/or sodium methylate, at temperatures of 110° to 200° C. and preferably at temperatures of 140° to 175° C. and under pressures of $10^5$ to $2·10^6$ Pa (cf. for example "Chemische Technologie", Vol. 7, pages 131 to 132, Carl-Hanser-Verlag, München/Wein (1986)). The alkylene oxide content of the alkoxylated polyhydroxy alcohols is from 4 to 600%, and is preferably from 40 to 120% by weight, based on the non-alkoxylated compounds.

The ethoxylated soya glycerides of the present invention may be produced by known methods. In general, however, they are formed by reacting white soybean oil with ethylene oxide in a molar ratio of from about 1:2 to about 1:60.

Finally, with respect to the polyol employed in the collector composition, examples of polyols which may be used include glycols such as ethylene glycol, propylene glycol, pentaerythritol, ethoxylated pentaerythritol, alkyl polysaccharides, and carbohydrate-derived polyols. In general, any known polyol and derivative thereof may be employed as the polyol, component (c), of the collector composition.

The de-inking collector composition of the present invention comprises a mixture of (a) from about 1 to about 99% by weight of the reaction product of an epoxidized derivative of a $C_{10}$–$C_{22}$ carboxylic acid with an alkoxylated polyhydroxy alcohol, or an ethoxylated derivative of a $C_{10-22}$ carboxylic acid, (b) from about 99 to about 1% by weight of ethoxylated soya glycerides, and (c) from about 0 to about 60% by weight of a polyol, all weights being based on the weight of the collector composition.

In a preferred embodiment of the present invention, the collector composition contains (a) from about 10 to about 90% by weight of the reaction product of an epoxidized derivative of a $C_{10}$–$C_{22}$ carboxylic acid with an alkoxylated polyhydroxy alcohol, or an ethoxylated derivative of a $C_{10-22}$ carboxylic acid, (b) from about 90 to about 10% by weight of ethoxylated soya glycerides, and (c) from about 0 to about 25% by weight of a polyol, all weights being based on the weight of the collector composition.

The present invention also provides for a process for deinking printed wastepaper comprising: (A) fiberizing said wastepaper in an aqueous deinking solution containing a deinking effective quantity of a collector composition containing a mixture of (a) from about 1 to about 99% by weight of the reaction product of an epoxidized derivative of a $C_{10-22}$ carboxylic acid and an alkoxylated polyhydroxy alcohol, or an ethoxylated derivative of a $C_{10-22}$ carboxylic acid, (b) from about 99 to about 1% by weight of an ethoxylated soya glyceride, and (c) from about 0 to about 60% by weight of a polyol, all weights being based on the weight of the composition; and (B) removing the detached ink particles from the deinking solution. Mixtures of components (a) and (b), or mixtures of (b) and (c) are also suitable in the process.

In the presence of the collector composition according to this invention, water-dilutable and/or solvent-containing printing inks, and/or solvent free inks, especially water-dilutable printing inks, for example, rotary newsprint inks, book printing inks, offset printing inks, illustration intaglio printing inks, flexographic printing inks, laser printing inks and/or packaging intaglio printing inks, and/or xerographic inks may be removed from printed wastepaper, for example newspapers, magazines, computer paper, journals, brochures, forms, telephone directories and/or catalogues. The deinked wastepaper obtained is distinguished by very high degrees of brightness. In general, from about 0.01 to about 5% by weight of said collector composition, based on the weight of the air-dry paper stock, is added to the deinking solution. In a preferred embodiment from about 0.1 to about 0.9% by weight of said collector composition, based on the weight of the air-dry paper stock, is added to the deinking solution. Air-dry paper stock means that an equilibrium state of internal moisture has established itself in the paper stock. This equilibrium state depends both on the temperature and on the relative humidity of the air.

Printed wastepaper is refined in a pulper at 20° C. to 80° C. at a pulp concentration of, for example, 1 to 30% by weight in an aqueous solution typically containing 0 to 2.0% by weight 100% hydrogen peroxide, 0 to 2.5% by weight NaOH, 0 to 4.0% by weight soda waterglass (silicate) having a solids content of about 35% by weight (37 to 40° Be), and 0.01 to 5% by weight of the collector composition. After a residence time of 60 to 120 minutes at temperatures in the range from 20° C. to 80° C., the paper stock suspensions are stirred into water or water is added to them so that 0.6 to 1.6% by weight stock suspensions are obtained. The detached printing ink particles are then removed from the stock suspensions in known manner by washing out or by flotation (Ullmanns Enzyklopädie der technischen Chemie, 4th Edition. Vol. 17, pages 570 to 571 (1979)). Flotation is preferably carried out in known manner, for example in a Denver flotation cell.

The present invention will be better understood from the examples which follow, all of which are intended to be illustrative only and not meant to unduly limit the scope of the invention. Unless otherwise indicated, percentages are on a weight-by-weight basis.

EXAMPLES

Preparation of component (a) reaction product:

To about 225 grams of ethoxylated sorbitol containing about 40 moles of ethylene oxide per mole of sorbitol heated to a temperature of about 160° C. was added about 100 grams of soybean oil epoxide. The soybean oil epoxide had a fatty acid composition of about 11.5% palmitic acid, 4.0% stearic acid, 24.5% oleic acid, 53% linoleic acid, and 7.0% linolenic acid; an epoxide content of about 7% by weight; an iodine value of about 0.8; and an acid value of about 0.3. The mixture was reacted under a nitrogen gas purge at a temperature of about 200° C. After about two hours, the reaction temperature was increased to about 230° C., and about 0.32 gram of p-toluenesulfonic acid was added to the reaction mixture. After about three hours, the reaction was stopped. The product was found to have a residual oxirane content of about 0.20. Component (a) was also prepared as above containing about 10, 40 or 60 moles of ethylene oxide per mole of sorbitol.

Preparation of component (b) ethoxylated soya glycerides containing about 9 moles of ethylene oxide:

7.278 grams of high density glycerine and 63.655 grams of refined white soybean oil were added to a reaction vessel. The reaction vessel was fitted with an agitator and turned on. 0.08 grams of flaked caustic potash were then added to the vessel. The reaction vessel was then sealed and heated to between 150°–160° C. under full vacuum for approximately 0.5 hours. Nitrogen was then introduced to bring the reactor to room pressure. The contents was then tested for percent moisture, which was below 0.10. The reaction vessel was then cooled to between 120°–125° C., at which time 3.905 grams of ethylene glycol was added to the reaction vessel. The reaction vessel was then sealed, and from 25–28" of vacuum was pulled. The reaction vessel was then pressurized to 6 psi with nitrogen gas, after which 24.948 grams of ethylene oxide was added thereto. Once the pressure in the reaction vessel stabilized for 30 minutes this indicated that the reaction was complete. Vacuum was then pulled and the reaction vessel was purged with nitrogen for 1 hour. The reaction vessel was then brought to room pressure and a sample of the reaction product was tested for hydroxyl and saponification value. The hydroxyl value was 200 and the saponification value was 120. The reaction vessel was then again purged with nitrogen under slight vacuum for one hour. The reaction vessel was then brought to room pressure and cooled to 70°–80° C. 0.160 grams of benzoic acid was then added so that the reaction product had a pH of about 7.0. Component (b) was also prepared as above containing about 24 or about 40 moles of ethylene oxide.

Preparation of collector composition:

Example I 20 grams of ethoxylated soya glycerides (9 moles E.O.) was added to 70 grams of the component (a) reaction product (40 moles E.O.), along with 10 grams of propylene glycol. The mixture was then mixed for one hour. This mixture was then tested by employing it in a flotation deinking process.

Example II 25 grams of ethoxylated soya glycerides (9 moles E.O.) was added to 70 grams of the component (a) reaction product (40 moles E.O.), along with 5 grams of propylene glycol. The mixture was then mixed for one hour. This mixture was then tested by employing it in a flotation deinking process.

Example III 66.67 grams of ethoxylated soya glycerides (9 moles E.O.) was added to 33.33 grams of the component (a) reaction product (40 moles E.O.), along with 10 grams of propylene glycol. The mixture was then mixed for one hour. This mixture was then testedby employing it in a flotation deinking process.

Example IV 20 grams of ethoxylated soya glycerides (9 moles E.O.) was added to 80 grams of the component (a) reaction product (40 moles E.O.), without any polyol. The mixture was then mixed for one hour. This mixture was then tested by employing it in a flotation deinking process.

Example V 30 grams of ethoxylated soya glycerides (9 moles E.O.) was added to 70 grams of the component (a) reaction product (60 moles E.O.) without any polyol. The mixture was then mixed for one hour. This mixture was then tested by employing it in a flotation deinking process.

Example VI 50 grams of ethoxylated soya glycerides (40 moles E.O.) was added to 50 grams of the component (a) reaction product (40 moles E.O.) The mixture was then mixed for one hour. This mixture was then tested by employing it in a flotation deinking process.

Example VII 50 grams of ethoxylated soya glycerides (9 moles E.O.) was added to 50 grams of the component (a) reaction product (40 moles E.O.) The mixture was then mixed for one hour. This mixture was then tested by employing it in a flotation deinking process.

Comparison Example I 100 grams of the component (a) reaction product (40 moles E.O.) without any ethoxylated soya glyceride or polyol was employed as the collector composition and tested in a flotation deinking process.

Comparison Example II 100 grams of the component (b) ethoxylated soya glyceride (9 moles E.O.) was employed as the collector composition and tested in a flotation deinking process.

Comparison Example III 100 grams of ethyoxylated derivative of $C_{10-22}$ carboxylic acid (a) without component (b) and without any polyol.

Comparison Example IV 100 grams of component (a) reaction product (10 moles E.O.) without component (b) and without any polyol.

Flotation Deinking Procedure:
APPARATUS:

1) Large capacity, cross direction paper shredder;
2) Denver flotation cell;
3) Laboratory pulper, Hobart Model N-50;
4) Laboratory disperger, Century Model SPB56;
5) Sheetforming apparatus, Ernst Gaage, Model 20.12, BB1;
6) Brightness meter, Technidyne Brightmeter Micro S-5;
7) pH meter;
8) Water bath set at 45° C.;
9) Balance, digital top loading;
   capacity: 4000/400 gram
   readability: 0.1/0.01 gram
10) Timer;
11) Vacuum filtration system with Buchner (Doors 60246) filter funnel;
12) Filter paper, qualitative grade, 15.0 cm;
13) Rubber spatulas;
14) 4L stainless steel beaker with lid;
15) 5L plastic beaker;
16) 25 mL glass beakers; and
17) COCAP Dot-Counter 2.0.

REAGENTS:

a) sodium hydroxide, 50% w/w (CAS #1310-73-2);
b) sulfuric acid (CAS #7647-01-0);
c) tap water (<50 ppm hardness); and
d) calcium chloride, dihydrate, 2% soln. (CAS #10035-04-8)

PROCEDURE:

A 13% by weight consistency of office printed wastepaper was introduced into a pulper at 130° F. and pulped for about 30 minutes. The water had a total hardness of about 80 ppm. The pH of the pulp slurry was adjusted to between 9 and 10 with sodium hydroxide. The pulp slurry also contained about 1% by weight of sodium silicate, about 0.4% by weight of DTPA, and about 0.75% by weight of 50% hydrogen peroxide. After the pulping stage the paper slurry was diluted to 1% by weight in a dump chest, screened for 15 minutes, then placed in a chest (explain), and then placed in a flotation cell for 30 minutes.

The results of these evaluations are summarized in the following Table I.

TABLE I

| deinking collector | quantity of deinking collector %/Wt | brightness gain | %ink removal | Average %ink removal improvement | foam height (cm) |
| --- | --- | --- | --- | --- | --- |
| Ex. I | 0.15 | | 92 | 18 | |
| Ex. II | 0.15 | | 93 | 20 | |
| Ex. III | 0.15 | 5.3 | 87 | 12 | 77 |
| Ex. IV | 0.15 | 2.0 | 88 | 13 | 114 |
| Ex. V | 0.2 | 11.9 | 91 | 17 | |
| Ex. VI | 0.15 | | 89 | | |
| Ex. VII | 0.15 | | 95 | | |
| Comp. Ex. I | 0.15 | 2.1 | 78 | | 123 |
| Comp. Ex. II | 0.15 | 5.1 | 78 | | 101 |
| Comp. Ex. III | 0.15 | 3.5 | 72 | | 120 |
| Comp. Ex. IV | 0.15 | 2.2 | 83 | | 152 |

Calculations:

The deinkability value (Brightness Gain) was calculated by subtracting the average brightness of the pre-float suspension pad from the average brightness of the post-float suspension pad according to the following formula:

A=Average of 8 readings on the pre-float suspension pad.
B=Average of 8 readings on the post-float suspension pad.
Brightness Gain=A−B Foam height was determined per the following Waring blender foam test which provides an indication of foaming under dynamic conditions.
APPARATUS:
Waring Blender, Timer, Parafilm
SAMPLE PREPARATION:
Prepare a 0.5% solution (1.5 g/300 ml in mill water). Mill water is prepared at 150 ppm water hardness. The solution is prepared at a temperature of 45° C. and a pH of 10.
PROCEDURE Dispense 250ml of the sample into the cylinder. Cover the mouth of the cylinder with parafilm. Mix for one minute at high speed. At the end of one minute take a reading (this is the initial foam height) and start the timer. Continue taking readings of the foam height over time.

What is claimed is:

1. A process for de-inking wastepaper containing printing ink comprising the steps of:
   A. fiberizing said wastepaper in an aqueous deinking solution containing a deinking effective quantity of a collector composition comprising a mixture of (a) the reaction product of an epoxidized derivative of a $C_{10-22}$ carboxylic acid with an alkoxylated polyhydroxy alcohol, or an ethoxylated derivative of a $C_{10-22}$ carboxylic acid, (b) an ethoxylated soya glyceride, and (c) a polyol; whereby said printing ink is detached from said wastepaper, and
   B. removing the detached ink particles from the deinking solution.

2. The process of claim 1 wherein said collector composition comprises a mixture of (a) from about 1 to about 99% by weight of the reaction product of an epoxidized derivative of a $C_{10-22}$ carboxylic acid and an alkoxylated polyhydroxy alcohol, or an ethoxylated derivative of a $C_{10-22}$ carboxylic acid, (b) from about 99 to about 1% by weight of ethoxylated soya glyceride, and (c) from 0 to about 60% by weight of a polyol, all weights being based on the weight of said composition.

3. The process of claim 1 wherein said collector composition is present in said deinking solution in an amount of from about 0.01 to about 5% by weight, based on the dry weight of said waste paper.

4. The process of claim 1 wherein said step A is carried out at a temperature of from about 20° C. to about 80° C.

5. The process of claim 1 wherein said epoxidized derivative of a $C_{10-22}$ carboxylic acid of said component (a) is selected from the group consisting of a) an ester thereof with a $C_{1-18}$ monohydric alcohol, b) a mono-, di-, or tri-glyceride thereof, c) an amide thereof, d) a mono- or di- $C_{1-4}$ alkylamide thereof, and e) a mono- or di- $C_{1-4}$ alkanolamide thereof.

6. The process of claim 1 wherein said alkoxylated polyhydroxy alcohol of said component (a) contains from about 4 to about 600% by weight of alkylene oxide, based on the weight of said component (a).

7. The process of claim 1 wherein said alkoxylated polyhydroxy alcohol of said component (a) contains from about 40 to about 120% by weight of alkylene oxide.

8. The process of claim 1 wherein said reaction product of said component (a) contains a $C_{16-22}$ carboxylic acid moiety.

9. The process of claim 1 wherein said polyol is selected from the group consisting of ethylene glycol, propylene glycol, pentaerythritol, ethoxylated pentaerythritol, alkyl polysaccharides, and carbohydrate-derived polyols.

10. The process of claim 1 wherein said ethoxylated soya glyceride comprises the reaction product of soybean oil with ethylene oxide in a molar ratio of from about 1:2 to about 1:60.

11. The process of claim 1 wherein said alkoxylated polyhydroxy alcohol comprises ethoxylated sorbitol.

* * * * *